United States Patent
Mannur (10) Patent No.: US 12,452,065 B2
(45) Date of Patent: Oct. 21, 2025

(54) AUTHORIZATION TOKENS FOR AN AUTHENTICATED USER ACCESSING AN APPLICATION

(71) Applicant: T-Mobile USA, Inc., Bellevue, WA (US)

(72) Inventor: Amit Kumar Mannur, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 154 days.

(21) Appl. No.: 18/307,291

(22) Filed: Apr. 26, 2023

(65) Prior Publication Data

US 2024/0364519 A1    Oct. 31, 2024

(51) Int. Cl.
*H04L 9/32* (2006.01)
*H04L 9/40* (2022.01)

(52) U.S. Cl.
CPC ........ *H04L 9/3213* (2013.01); *H04L 63/0807* (2013.01); *H04L 63/10* (2013.01); *H04L 9/3247* (2013.01)

(58) Field of Classification Search
CPC .................. H04L 9/3213; H04L 9/3247; H04L 63/0807; H04L 63/10
See application file for complete search history.

(56) References Cited

U.S. PATENT DOCUMENTS

| | | | |
|---|---|---|---|
| 7,114,076 B2 | 9/2006 | Callaghan | |
| 7,814,125 B2 | 10/2010 | Berry et al. | |
| 7,845,013 B2 | 11/2010 | Bhogal et al. | |
| 8,032,932 B2 | 10/2011 | Speyer et al. | |
| 8,707,398 B2 | 4/2014 | Rauh et al. | |
| 8,914,842 B2 | 12/2014 | Mani et al. | |
| 8,924,723 B2 | 12/2014 | Chang et al. | |
| 9,117,229 B2 | 8/2015 | Setton | |
| 9,231,939 B1 | 1/2016 | Morrison | |
| 9,332,433 B1 | 5/2016 | Dotan et al. | |
| 9,774,586 B1 * | 9/2017 | Roche | H04L 63/08 |
| 9,779,233 B2 | 10/2017 | Mukherjee et al. | |

(Continued)

FOREIGN PATENT DOCUMENTS

| | | |
|---|---|---|
| CN | 111405036 A | 7/2020 |
| CN | 111639319 A | 9/2020 |

(Continued)

*Primary Examiner* — Robert B Leung (74) *Attorney, Agent, or Firm* — Perkins Coie LLP (57) ABSTRACT

Aspects of the present disclosure relate to authorization tokens for an authenticated user accessing an application. An authenticator provides user authentication information in response to a user request to access an application of a service provider. The user authentication information is used to determine business functions accessible to the user device. The user authentication information is compared with metadata of the application to determine a subset of business functions to which the user device is provided access through the application. The application can further create an authorization token that can be decoded by the first application in response to subsequent requests to access the application. The decoded authorization token can be used to determine the subset of business functions to which the user device is provided access through the application.

19 Claims, 6 Drawing Sheets

(56) References Cited

U.S. PATENT DOCUMENTS

| | | |
|---|---|---|
| 9,860,241 B2 | 1/2018 | Dixon et al. |
| 10,033,763 B2 | 7/2018 | Koneru et al. |
| 10,057,763 B2 | 8/2018 | Redberg et al. |
| 10,068,082 B1 | 9/2018 | Zheng et al. |
| 10,182,460 B2 | 1/2019 | Apte et al. |
| 10,440,024 B2 | 10/2019 | Feijoo et al. |
| 10,645,583 B2 | 5/2020 | Bykampadi et al. |
| 10,915,890 B2 | 2/2021 | Douglas et al. |
| 10,963,553 B2 | 3/2021 | Bykampadi et al. |
| 11,063,762 B1 | 7/2021 | Makarskyy et al. |
| 11,297,686 B2 | 4/2022 | Liu et al. |
| 11,356,259 B1 | 6/2022 | Agnew et al. |
| 11,615,197 B1 | 3/2023 | Hu et al. |
| 2007/0130463 A1 | 6/2007 | Law et al. |
| 2008/0168539 A1 | 7/2008 | Stein |
| 2010/0286992 A1 | 11/2010 | Tkatch et al. |
| 2012/0130794 A1 | 5/2012 | Strieder |
| 2014/0258132 A1 | 9/2014 | Swamy et al. |
| 2016/0373456 A1 | 12/2016 | Vermeulen et al. |
| 2017/0195457 A1* | 7/2017 | Smith, II ............... H04L 63/10 |
| 2018/0211249 A1 | 7/2018 | Sims et al. |
| 2019/0028485 A1 | 1/2019 | Baird et al. |
| 2020/0104519 A1* | 4/2020 | Farber .................... G06F 21/629 |
| 2021/0064730 A1* | 3/2021 | Schrag ................... H04L 67/04 |
| 2022/0123944 A1 | 4/2022 | Wang et al. |
| 2023/0060068 A1 | 2/2023 | Sinha et al. |
| 2023/0093749 A1 | 3/2023 | Myers et al. |
| 2024/0187234 A1* | 6/2024 | Krishnan .............. H04L 9/3247 |

FOREIGN PATENT DOCUMENTS

| | | |
|---|---|---|
| CN | 111769939 B | 2/2021 |
| CN | 112491778 A | 3/2021 |
| CN | 114697055 A | 7/2022 |
| CN | 112039889 B | 11/2022 |
| CN | 115473754 A | 12/2022 |
| DE | 102013022434 B3 | 3/2021 |
| EP | 1995927 B1 | 10/2015 |
| EP | 3014539 A1 | 5/2016 |
| EP | 2819079 B1 | 11/2019 |
| JP | 2018010433 A | 1/2018 |
| JP | 6572750 B2 | 8/2019 |
| JP | 7059559 B2 | 4/2022 |
| KR | 101216699 B1 | 12/2012 |
| KR | 102028670 B1 | 10/2019 |
| KR | 102502167 B1 | 2/2023 |
| WO | 2006028683 A2 | 3/2006 |
| WO | 2015036642 A1 | 3/2015 |
| WO | 2016188256 A1 | 12/2016 |
| WO | 2020243798 A1 | 12/2020 |
| WO | 2021032912 A1 | 2/2021 |
| WO | 2021198552 A1 | 10/2021 |

* cited by examiner

AUTHORIZATION TOKENS FOR AN AUTHENTICATED USER ACCESSING AN APPLICATION

BACKGROUND

Authenticators/authorizers can utilize tokens to provide authentication and authorization for an application. Token-based authentication works by ensuring that each request to a server is accompanied by a signed token that the server verifies for authenticity and only then responds to the request. For example, a user can input a username and password to the authenticator, and after validating the username and password, the authenticator can create a token that authenticates the user. The application can attempt to validate the token by using a secret held by the application. If the correct secret is not held, the token cannot be verified, and the request is not processed. If the token is validated using the secret, however, the application can continue processing the request. The tokens can similarly provide authorization for an application. For example, the token can include an authorization field that indicates services that are accessible to the user on the application. Thus, when the token is validated, the services in the authorization field can be accessible to the user through the application.

BRIEF DESCRIPTION OF THE DRAWINGS

Detailed descriptions of implementations of the present invention will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Service providers can create applications that provide functionality to users. For example, a mobile network operator may have a first application (e.g., program, script, software package) that enables customers to browse and purchase products and a second application that enables customers to track their orders or initiate returns. Applications of a service provider can be protected by requiring a user to be authenticated to access the various applications provided by the service provider. In general, authentication relates to determining the identity of a user (e.g., associating the user with a registered user account). Some service providers perform authentication in-house, for example, by requiring a user to provide a username and password that is then verified using a database maintained by the service provider. Other service providers may choose to outsource authentication to a third-party authenticator that attests to the authenticity of the user based on the user having an account associated with the third-party authenticator. The third-party authenticator can return an authentication token that is verified by the service provider to complete authentication. In general, third-party authentication leverages the likelihood that a user has an account with one of the many platforms (e.g., social media platforms) that provide third-party authentication, such as Google®, Facebook®, and Twitter®. By allowing users to authenticate using these platforms, the overall burden to access the applications provided by the service provider can be reduced, thus increasing the likelihood that a user utilizes the service provider.

In many cases, third-party authenticators can similarly be used to provide authorization. In general, authorization relates to determining specific access that should be provided to the user by the service provider (e.g., read and write access). For example, a service provider can delegate authorization to the third party such that the third party can perform authorization in addition to authentication. The third party can maintain an authorization server that includes the authorization permissions of each user. The various authorization permissions can vary across each user. When the user requests to access one or more applications provided by the service provider, the third party can return an indication of the access that the user should be provided to the applications (e.g., in a tokenized form). For instance, a service provider can provide one or more business functions that users can perform through the applications. In general, business functions describe operations that can be performed by the user using the applications and the various resources connected to the applications. For example, different business functions can enable the user to read or write to different databases through operations performed using the various applications. As a specific example, a user can be provided access to a business function that enables the user to purchase a good or service offered for sale on an application of the service provider by writing an order to a database of orders.

Alternatively, authorization can be handled in-house. For example, a service provider can maintain the authorization server. The authorization server can contain a database of information specifying the specific business functions provided by the service provider that should be accessible to the user. The service provider can reference the authorization server and return the authorization permissions for the user. As a result, the authorization server can provide the user access to the business functions indicated in the authorization server.

One downfall of third-party authorization and other in-house authorization technologies is that authentication is performed at the service provider level. That is, authorization is provided based on all business functions provided by the service provider, not the specific business functions that a particular application of the business provider provides or enables. In this way, these technologies do not enable application-level control of the business functions accessible to the user within each application of the service provider.

In contrast to these technologies, aspects of the present technology enable authorization tokens to be provisioned by each application such that the token can be used to provide access to one or more business functions provided by the application. For example, an application-programming interface (API) of the service provider can receive, from a user device of a user, a request to access a first application provided by the service provider. The API can receive user authentication information that attests to the authenticity of the user. In aspects, the user authentication information can be received in the form of a token that can be verified by the service provider. The user authentication information can be used to search a user information database (e.g., within an authentication server) to determine a first set of business functions provided by the service provider and accessible to the user (e.g., through the user device). The first set of business functions can be provided to the first application.

The first application can include first metadata that indicates a second set of business functions provided by the first application. The second set of business functions can be dynamic, meaning that they can be different at different times. As a specific example, the first application can include a user account management application that enables the user to edit and view current account settings on their account while blinding the user to account settings of one or more other accounts different from their account. The second set of business functions can be determined by an administrator of the first application or the service provider. Thus, in reference to the example above, the user associated with the first application or the service provider can enable the user to edit their account settings at a first time and disable the user from editing their account settings at a second time.

The first set of business functions and the first metadata can be used to determine a third set of permissions that the user can access through the first application. In aspects, the third set of permissions can be the overlap between the first set of business functions and the second set of business functions. For example, if a user is permitted to make purchases through the service provider and the first application provides purchasing capability, the user can be permitted to make purchases using the first application.

The first application can further include a token generator that is capable of creating a token that includes authorization information that can be used by the first application to determine the third set of business functions. The token can be encoded with a first secret held by the first application. The first application can likewise decode the token using the first secret. In some cases, the token can encode the first set of business functions, which can be compared with the first metadata to determine the third set of business functions. In this way, the token need not directly encode the third set of business functions.

The token can be returned from the first application and associated with an API call made by the user device. The API call can include a token field within the header of the API call. When an additional request is received from the user device to access an application (e.g., the first application or another application) of the service provider, the token can be provided to the application to determine the permissions. For example, the user device can issue a subsequent request to access the first application. The token can then be retrieved by the first application (e.g., from the token field of the API call or from a gateway maintaining the token). The token can be used to determine the third set of business functions. For example, the first application can decode the token using the first secret possessed by the first application. The user is then permitted to access the third set of business functions through the first application.

The token can be specific to the first application. Specifically, as discussed above, the token can be generated using the first secret held by the first application. Thus, a second application different from the first application may fail to decode the second token. Take for example, a situation in which the user requests to access the second application after the user has been given access to the first application. When providing the user access to the first application, the token was provided to the first application. Thus, when the user attempts to access the second application, the token can be provided to the second application. The second application can attempt to decode the token using a second secret held by the second application. Given that the token was encoded using a first secret, however, the second application fails to decode the token and instead provides the token back to the first application.

In some embodiments, the first application can decode the token to determine the first set of business functions accessible to the user across the multiple applications. The first set of business functions can then be provided to the second application such that the second application can determine a fourth set of business functions to provide to the user through the second application. For example, the second application can include second metadata indicative of a fifth set of business functions provided by the second application. The second application can compare the first set of business functions to the fifth set of business functions to determine the fourth set of business functions that are provided to the user through the second application. In some cases, the first application can additionally provide the second application the algorithm used to generate the token such that the second application can generate an additional token usable to determine the fourth set of business functions that are provided to the second application through the second application. For example, the additional token can be created using the first set of business functions, the second metadata, and/or a second secret of the second application. The additional token can be stored similar to the token.

In other embodiments, the second application can provide the first application with the second metadata and the token. The first application can decode the token to determine the first set of business functions accessible to the user and provided by the service provider across all of the applications. The first set of business functions can be compared to the second metadata to determine the fourth set of business functions. The fourth set of business functions can then be provided to the second application, and the user can be provided access to the fourth set of business functions through the second application. In aspects, determining the first set of business functions by decoding the token using the first application can reduce calls to the user information server. In doing so, server traffic can be limited.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

Figure 1:
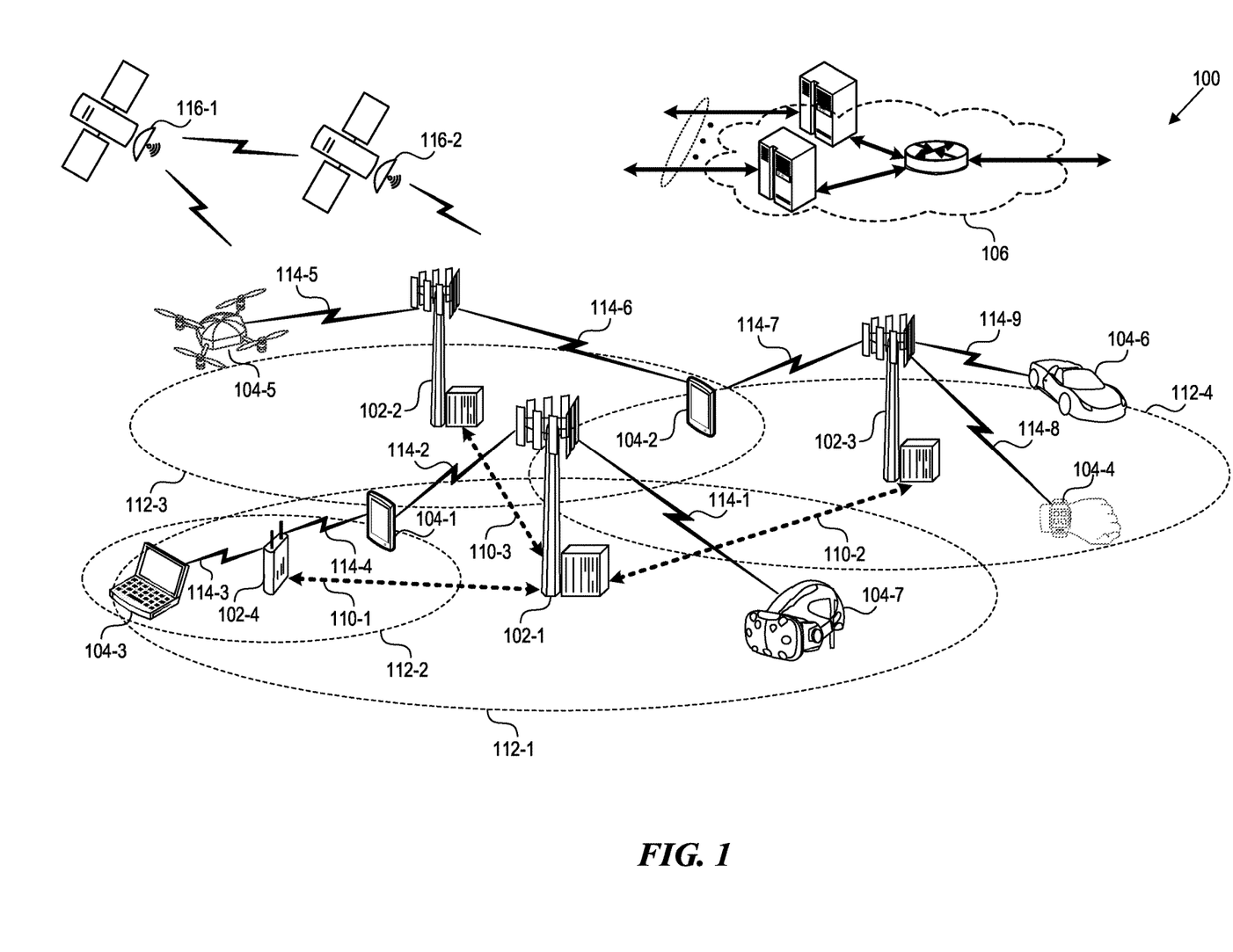
FIG. 1 illustrates a wireless communications system that can implement aspects of the present technology.

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier, or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

Authorization Tokens

Figure 2:
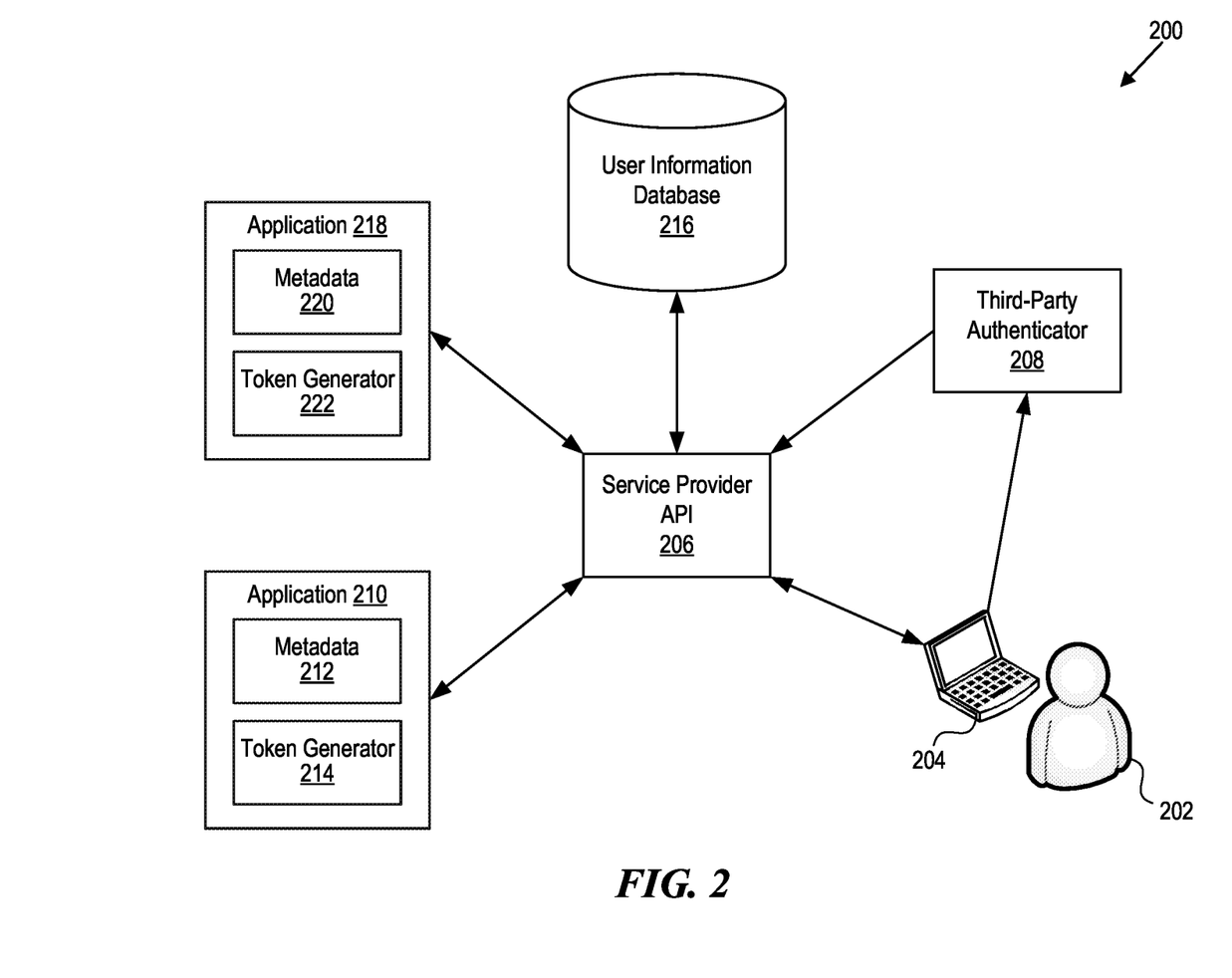
FIG. 2 illustrates an example operating environment in which one or more aspects of the present technology can be implemented.

FIG. 2 illustrates an example operating environment 200 in which one or more aspects of the present technology can be implemented. The environment 200 includes a user 202 having a user device 204. As illustrated, the user device 204 is a laptop. In other examples, however, the user device 204 can be implemented as any other electronic device, such as a smartphone, desktop, wearable device (e.g., smartwatch, smart glasses), game console, or vehicle. The user 202 can issue commands using the user device 204. For example, the user device 204 can be used to issue a request to access one or more applications of a service provider (e.g., a mobile network operator). The request can be received through a service provider API 206.

The user device 204 can be authenticated before the user device 204 is provided access to the service provider. Authentication can be delegated to a third-party authenticator 208. The third-party authenticator 208 can include a social networking platform, such as Google®, Facebook®, and Twitter®. The user 202 can be prompted to input user credentials (e.g., username and password) to log into a user account associated with the third-party authenticator 208. The third-party authenticator 208 can then compare the user credentials to an account database, and if the credentials match, the third-party authenticator 208 can provide user authentication information to the service provider API 206. Although illustrated and described with respect to third-party authentication 208, embodiments of the present technology need not be restricted to implementations that utilize third-party authentication and can similarly be applied to implementations that utilize in-house authentication. Thus, it is appreciated that such in-house authentication embodiments are within the scope of this disclosure.

The user authentication information can include an indication of the identity of the user 202. The user authentication information can be included within an authentication token that can be verified by the service provider API 206. For example, the service provider API 206 can include a key used to sign the authentication information. Once verified, the authentication token can be maintained in a gateway of the service provider API 206 such that the authentication process need not be performed in response to subsequent requests from the user device 204. The authentication token can include an expiration time. Once the expiration time has lapsed, the authentication token can become invalid and additional authentication of the user device 204 may be needed.

Once the user authentication information is verified, the service provider API 206 can use the user authentication information to retrieve data from the user information database 216. The user information database 216 can include authorization information associated with each user registered with the service provider. The authorization information can include a subset of business functions from the set of business functions provided across all of the applications of the service provider that an associated user is authorized to access. For example, the user information database 216 can include a set of business functions that the user 202 has permission to access across the various applications of the service provider. The set of business functions to which the user device 204 is permitted to access across the various applications can be returned to the service provider API and used to provide the user device 204 access to business functions provided by an application of the service provider.

As illustrated, the environment 200 includes the application 210, which includes metadata 212 and token generator 214, and application 218, which includes metadata 220 and token generator 222. As discussed above, the user 202 requests access to an application 210 of the service provider using the user device 204. For example, the user 202 could navigate to a web address of a website of the service provider and select a user account button. Thus, the user device 204 can issue a request to access the application 210, which in this case is a user account application. In response to the request, the set of business functions that the user device 204 is permitted to access across the various applications can be retrieved from the user information database 216 and provided to the application 210. Although the user information database 216 is illustrated as being accessed through the service provider API, in other cases, the user information database 216 can be accessed directly from the application 210 (e.g., or the application 218).

The application 210 includes metadata 212, which can indicate one or more business functions provided by the application 210. For example, with respect to the example in which the application 210 is a user account application, the one or more business functions provided by the application 210 can include the ability to view or edit user account settings (e.g., by reading from/writing to a user account database) for user accounts associated with the requesting user or one or more other users. The metadata 212 can be compared with the set of business functions to which the user device 204 is permitted to access across the various applications to determine overlapping business functions that the user is permitted to access and that are provided by the application 210. Access to the overlapping business functions can be provided to the user device 204 through the application 210. For example, if the user 202 is a customer of the service provider that is authorized to view and edit their own account settings but not the account settings of other users' accounts, the overlapping business functions can allow the user device 204 to view and edit account settings of only their account. Alternatively, if the user 202 is a customer service representative of the service provider with authorization to view or edit all users' accounts, the user device 204 can edit or view each respective set of user account settings associated with each respective user account.

In aspects, the user 202 can be permitted to perform one or more business functions that the application 210 does not allow. That is, the business functions received from the user information database 216 and relating to the user 202 can include one or more business functions that are not included within the business functions indicated in the metadata 212. As a specific example, the business functions received from the user information database 216 can indicate that the user device 204 is permitted to perform purchases within an application of the service provider, however, the metadata 212 indicates that users are not permitted to perform purchases in the application 210. As a result, the user device 204 will not have access to a business function related to performing purchases through the application 210.

To reduce the need to call the user information database 216 in response to each request from the user device 204 to access the application 210, the application 210 can include a token generator 214 that creates an authorization token (e.g., decodable by the application 210 but not the application 218) that can be used to determine the business functions to which the user device 204 should have access within the application 210. The token generator 214 can include an algorithm (e.g., a hashing algorithm) that encodes information related to the business functions that should be provisioned to the user device 204 through the application 210. For example, the token generator 214 can generate the authorization token based on all business functions accessible to the user 202 across the applications of the service provider, the metadata 212, and/or a secret kept by the application 210. In aspects, the encoded authorization token can be represented as a number (e.g., an integer) in decimal format. The authorization token can be decoded using the secret to determine the business functions that should be provisioned to the user device 204 through the application 210. In some cases, the authorization token could be decoded to directly determine the business functions that should be provisioned to the user device 204 through the application 210. In other cases, the authorization token can be decoded to determine all of the business functions accessible to the user 202 across all applications of the service provider (e.g., similar to the business functions permissions received from the user information database 216 but without having to call the database 216), and these business functions can be compared with the metadata 212 to determine the business functions that are to be provisioned to the user device 204 through the application 210.

The authorization token can be returned from the application and stored within an API call (e.g., a call to the service provider API 206) associated with the user (e.g., or the user device 204). In some embodiments, the authorization token can be stored within an authorization token field of the API call (e.g., within a header). The authorization token can be provided to the application 210 or any other application during a subsequent request to access that application. For example, the user device 204 can issue an additional request to access the application 210 (e.g., or a business function of the application 210), and in response the authorization token can be provided to the application 210. The application can decode the authorization token (e.g., using the secret held by the application 210) and utilize the decoded authorization token to determine the business functions that are to be provisioned to the user device 204 through the application 210, access to which can then be provided to the user device 204.

In some embodiments, the authorization token need not be provided to the application 210 in response to a subsequent request to access the application 210 because the application 210 maintains the authorization token after generation. For example, the authorization token can be maintained within a gateway of the application 210. The authorization token can have an expiration time, until the expiration of which the token is valid. Thus, the application 210 can provision the business functions to the user device 204 without additional reception of the authorization token as long as the authorization token is valid and maintained within the gateway.

The authorization token can similarly be provided to other applications of the service provider in response to a request from the user device 204 to access one of these applications. For example, the user device 204 can issue a request to access the application 218. The application 218 can receive the authorization token and attempt to decode it using a secret held by the second application 218. In aspects, the authorization token cannot be decoded using the second secret and thus the authorization token cannot be used to determine to which business functions the user device 204 is to be provided access through the application 218. In response to attempting (e.g., and failing) to decode the authorization token using the secret maintained by the application 218, the authorization token can be provided to the application 210 where it is decoded using the secret held by the application 210. In aspects, decoding the authorization token can reveal information indicative of all business functions permitted to be accessed by the user device 204 through the various applications of the service provider (e.g., similar to the business functions permissions received from the user information database 216 but without having to call the database 216). These business functions can be returned to the application 218 and compared to metadata 220 that indicates business functions accessible through the application 218 to determine overlapping business functions to provision to the user device 204 through the application 218. In this way, the business function to provision to the user device 204 through the application 218 can be determined from the authorization token without a call to the user information database 216.

In other cases, the application 218 can provide to the application 210 the metadata 220 along with the authorization token such that the application 210 can compare the decoded token and the metadata 220 to determine business functions to provision to the user device 204 through the application 218. This list of business functions can then be returned to the application 218 such that the application 218 can provide the user device 204 access to these business functions through the application 218.

In yet other aspects, the application 218 can create an additional authorization token (e.g., decodable by the application 218 but not the application 210) that can be used to determine the business functions that are to be provisioned to the user device 204 through the application 218. For example, in response to receiving the authorization token, the application 210 can provide the algorithm for creating the authorization token (e.g., from the token generator 214) to the application 218. The algorithm can be used by the token generator 222 of the application 218 to generate an additional authorization token based on the business functions permitted to be accessed by the user device 204 through the various applications of the service provider, the metadata 220, and/or the secret held by the second metadata. Similar to the authorization token from application 210, the additional authorization token can be returned from the application 218 and used to provide the user device 204 access to business functions in response to subsequent requests to access the application 218 or other applications. In some embodiments, the token generator 222 need not receive the algorithm from the application 210 but instead can already include the algorithm or a similar algorithm usable to generate the additional authorization token. In yet other embodiments, the algorithm can be retrieved from a library separate from the application 210.

In some cases, the application 218 can call the user information database 216 (e.g., through the service provider API 206) to receive all business functions permitted to be accessed by the user device 204 through the various applications of the service provider. In this way, this information need not be received from the application 210 using the authorization token. Additional calls to the user information database 216 can cause congestions, however, and thus, in some instances, there is a benefit to attaining the business functions permitted to be accessed by the user device 204 through the various applications of the service provider from the application 210 using the authorization token generated by the application 210, as described above.

At different times, the metadata 212 or the metadata 220 of the application 210 and the application 218, respectively, can be altered to adjust the business functions that are enabled to be performed within these applications. In doing so, the overlap between the business functions permitted to be accessed through the applications and all business functions permitted to be accessed by the user device 204 through the various applications of the service provider will be changed as the metadata 212 or the metadata 220 change. Accordingly, business functions accessible to the user device 204 through each application can be dynamically changed on a per-application basis at different times.

Figure 3:
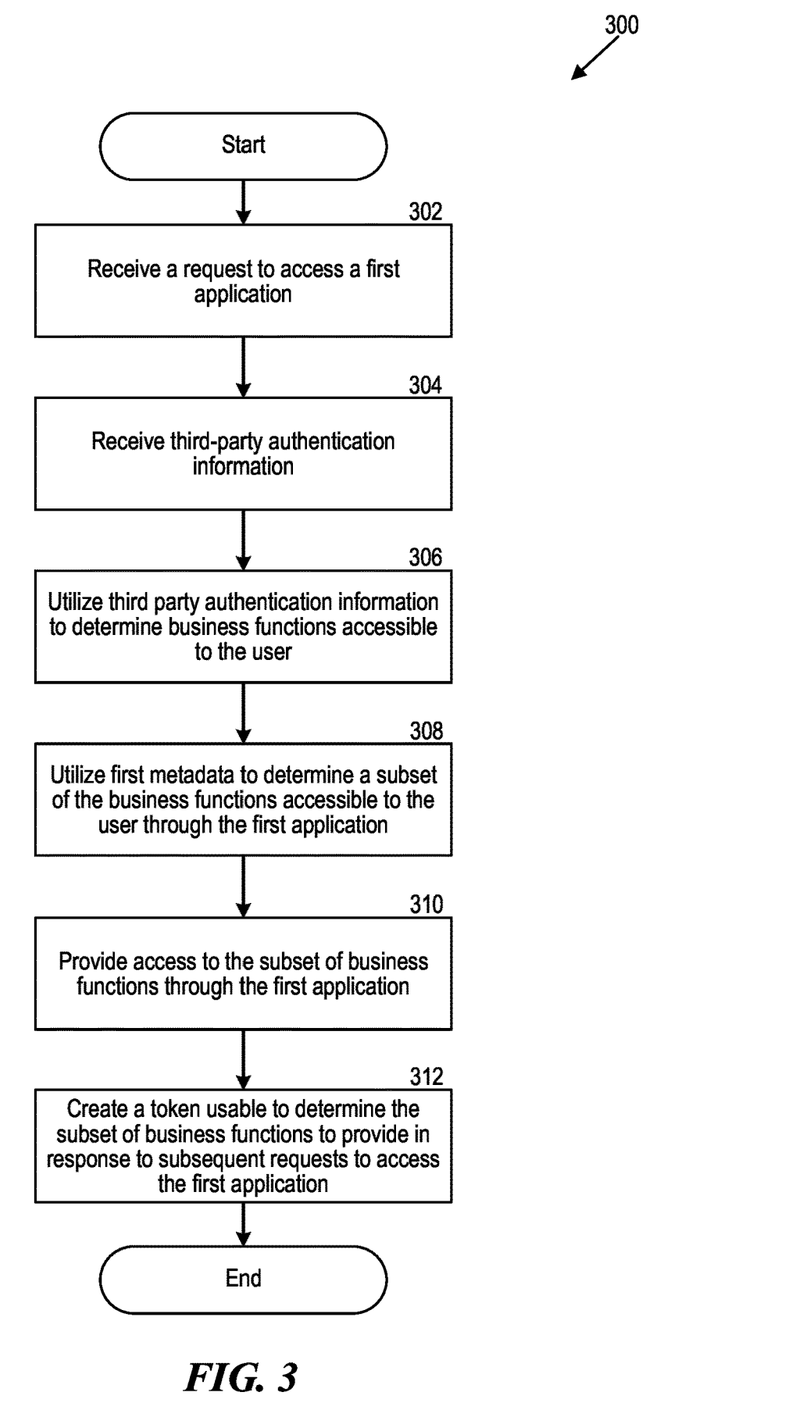
FIG. 3 illustrates an example method for creating an authorization token and providing access to an application.

FIG. 3 illustrates an example method 300 for creating an authorization token and providing access to an application. In aspects, the method 300 can be performed by a first application of a service provider or an API of the service provider.

At 302, a request to access a first application is received. The request can be associated with a user device of a user registered with the service provider. As a specific example, the request can result from the user navigating to a website of the service provider or selecting a button on a user interface of the service provider.

At 304, third-party authentication information is received. For example, an authentication token can be received from a third-party authenticator (e.g., a social networking platform). The third-party authentication information can be validated and maintained in a gateway of the service provider. The third-party authentication information can attest to the identity of the user of the user device. In some cases, the third-party authentication information can include an indication of the identity of the user of the user device.

At 306, the third-party authentication information is utilized to determine business functions accessible to the user across all applications of the service provider. For example, the third-party authentication information can be used to call a user information database that includes the business functions accessible to the user across all applications of the service provider.

At 308, first metadata of the first application is used to determine a subset of the business functions accessible to the user through the first application. The first metadata can include an indication of business functions that are enabled through the first application. The first metadata can be compared to the business functions accessible to the user across all applications of the service provider to determine overlapping business functions. For example, if the first metadata includes a business function that enables the purchases to be made through the first application and the user device has access to make purchases based on the business functions from the user information database, the user device can have access to make purchases through the first application. In other examples, the business functions can include the ability to review orders made through an application of the service provider or issue refunds on orders made through an application of the service provider. In some cases, the business functions that are enabled through the first application can be the same as the business functions accessible to the user across all applications. In this way, the user device can access all business functions accessible to the user across all applications of the service provider within the first application.

At 310, the user device is provided access to the subset of business functions through the first application. For example, the user device can navigate to a portion of a web page of the service provider that presents buttons that can be used to interact with the application. As a specific example, the portion of the web page can include information about the user's account that is registered with the service provider. The subset of business functions can include the permission to view and edit the account settings of the user's account. As a result, the user account settings can be displayed to the user on the user device through the web page. The web page can further include a "Change Settings" button that enables the user to adjust one or more user account settings by writing to a user account database. In aspects, one or more business functions that are enabled for the user generally but are not within the subset of business functions are not provided to the user device. For example, the user device may be allowed to perform purchases within the service provider, but the first application does not enable purchases to be made using the first application. As a result, the user device can be disabled from performing purchases within the first application.

At 312, a token is created that is usable to determine the subset of business functions to provide in response to subsequent requests to access the first application. For example, the token can be encoded using a secret held by the first application. The token can similarly be decoded by the first application using the secret. In response to subsequent requests from the user device to access the first application, the token can be retrieved and decoded (e.g., using the secret held by the first application) to determine to which business functions the user device will be enabled access through the first application.

Figure 4:
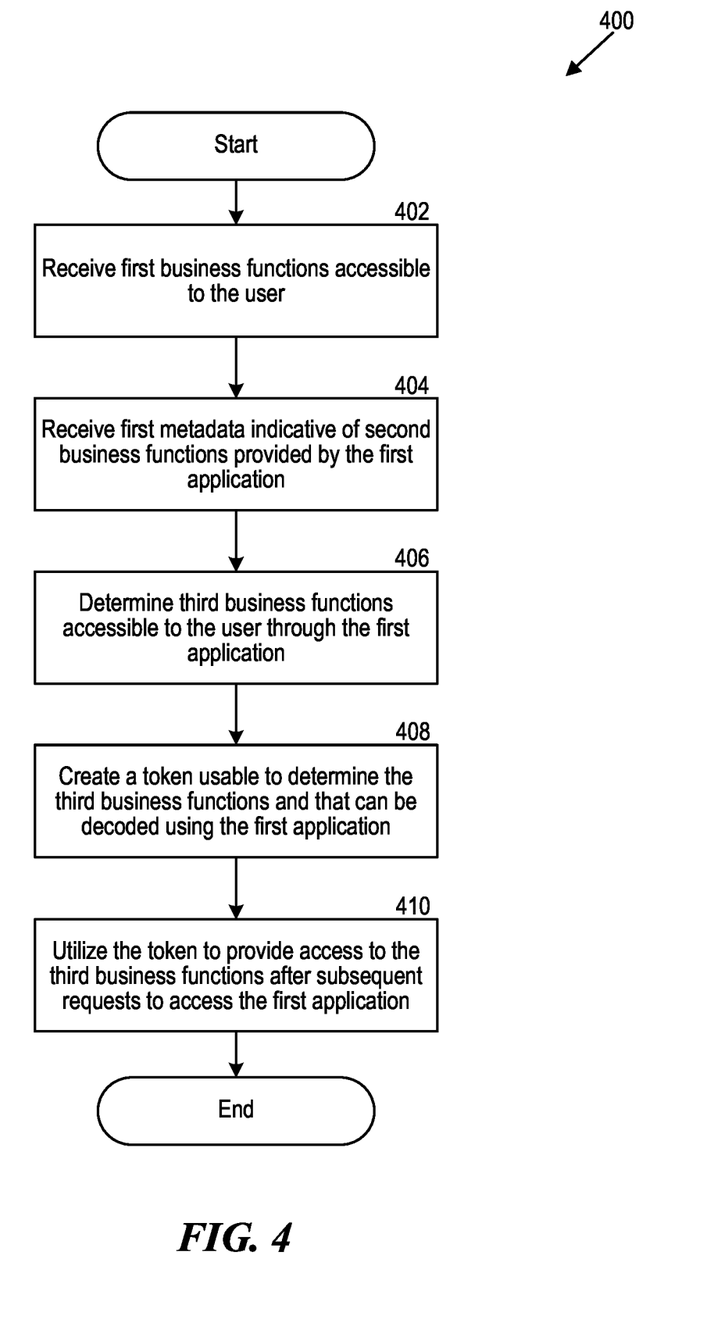
FIG. 4 illustrates an example method for utilizing an authorization token to provide access to an application.

FIG. 4 illustrates an example method 400 for utilizing an authorization token to provide access to an application. In aspects, the method 400 can be performed by the first application of the service provider or an API of the service provider.

At 402, first business functions accessible to the user across all applications of the service provider are received. For example, the first business functions can be received from a user information database. Details of receiving the business functions accessible to the user across all applications of the service provider have been described at 306 of FIG. 3 and elsewhere throughout this disclosure. Thus, additional details are omitted for the sake of brevity.

At 404, the first metadata is received that is indicative of second business functions provided by the first application. Details of the first metadata have been described at 308 of FIG. 3 and elsewhere throughout this disclosure. Thus, additional details are omitted for the sake of brevity.

At 406, third business functions accessible to the user device through the first application are determined. The third business functions can be determined by comparing the first business functions to the first metadata (e.g., the second business functions). Details of determining the third business functions have been described at 308 and at 310 of FIG. 3 and elsewhere throughout this disclosure. Thus, additional details are omitted for the sake of brevity.

At 408, a token is created that is usable to determine the third business functions and can be decoded using the first application. In some cases, the token is not directly indicative of the third business functions. Instead, the token can indicate the first business functions, which can be compared to the first metadata to determine the third business functions. Details of creating the token have been described at 312 of FIG. 3 and elsewhere throughout this disclosure. Thus, additional details are omitted for the sake of brevity.

At 410, the token is utilized to provide access to the third business functions after subsequent requests to access the first application. For example, the user can utilize the user device to request access to the first application after the first request to access the first application. The token can be received from an API call associated with the user device and decoded to determine the third business functions (e.g., by comparing the decoded information with the first metadata). Alternatively, the token can be maintained in a gateway of the service provider or the first application after the token is created or after the token is received in response to a request to access the first application.

Figure 5:
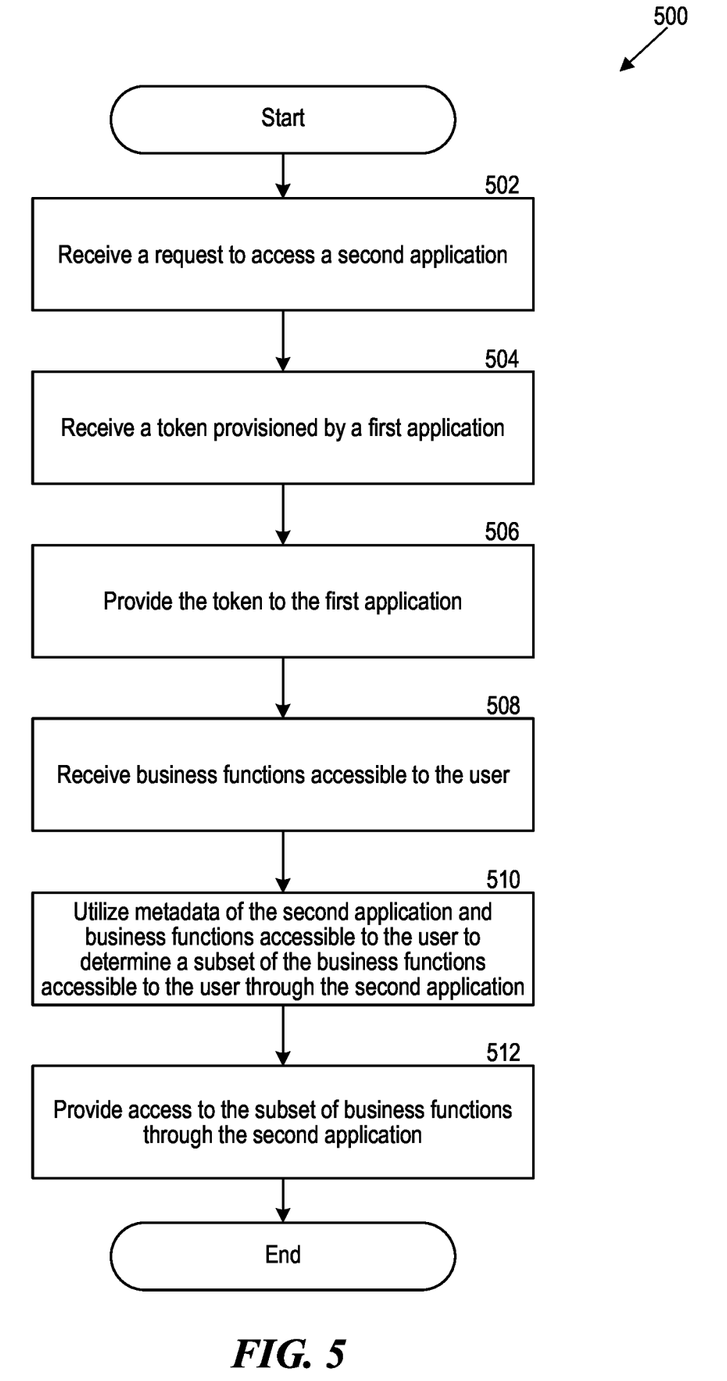
FIG. 5 illustrates an example method for handling an authorization token provisioned by a different application.

FIG. 5 illustrates an example method 500 for handling an authorization token provisioned by a different application. In aspects, the method 500 can be performed by a second application of the service provider different from the first application or an API of the service provider.

At 502, a request to access a second application is received. The user can utilize the user device to request access to the second application. For example, the user can select to purchase one or more items from a shopping cart provided by a retail application of the service provider, which results in the user device requesting access to a purchasing application. The request to access the second application can be received while the user device is still authorized on the service provider. Thus, additional authorization need not take place.

At 504, the token provisioned by the first application is received. For example, the token can be received from the header of an API call associated with the request to access the second application. Alternatively, the token can be retrieved from a gateway of the first application or the service provider in which the token is maintained. The second application can attempt to decode the token using a secret held by the second application. Given that the token was provisioned by the first application and in some cases is only decodable by the first application, the second application can fail to decode the token. Thus, the token can be provided to the first application to be decoded. The first application can decode the token using a secret held by the first application. In aspects, decoding the token can reveal information indicative of all business functions permitted to be accessed by the user device through the various applications of the service provider (e.g., the first business functions described at 306 of FIG. 3). These business functions can be returned to the second application at 508.

At 508, all business functions permitted to be accessed by the user device through the various applications of the service provider (e.g., the first business functions described at 306 of FIG. 3) are received. For example, the first business functions can be received from the first application. Alternatively, the second application can call the user information database to determine the first business functions independent of the first application.

At 510, second metadata and the first business functions can be utilized to determine a subset of the first business functions to which the user device will be provided access through the second application. The second metadata can include an indication of one or more business functions provided by the second application. The second metadata and the first business functions can be compared to determine the overlapping business functions, which will be included within the subset of the first business functions. In general, the subset of the first business functions can be determined in a similar fashion to that described at 308 of FIG. 3, albeit using the second metadata instead of the first. The subset of the business functions provided through the first application and the subset of business functions provided through the second application can be the same business functions or different business functions. Once the subset of the first business functions is determined, the user device is provided access to the subset of the first business functions through the second application at 512.

In other embodiments, the first application can determine the subset of the first business functions and provide this subset of the first business functions to the second application. For example, the second application can provide the second metadata with the token such that the first application can decode the token and compare the decoded information with the second metadata to determine the subset of the first business functions to which the user device is provided access through the second application (e.g., the operations described at 510 can be performed at the first application).

In some embodiments, the second application 218 can create an additional token (e.g., decodable by the second application but not the first application) that can be used to determine the subset of the first business functions to which the user device is provided access through the second application. For example, in response to receiving the token, the first application can provide the algorithm for creating the authorization token to the second application. The algorithm can be used by the second application to generate the additional token. Similar to the token provisioned by the first application, the additional authorization token can be returned from the second application and used to provide the user device access to business functions in response to subsequent requests to access the second application or other applications. In some embodiments, the second application need not receive the algorithm from the first application but instead can already include the algorithm or a similar algorithm usable to generate the additional token. In yet other embodiments, the algorithm can be downloaded from a library separate from the first application.

Computer System

Figure 6:
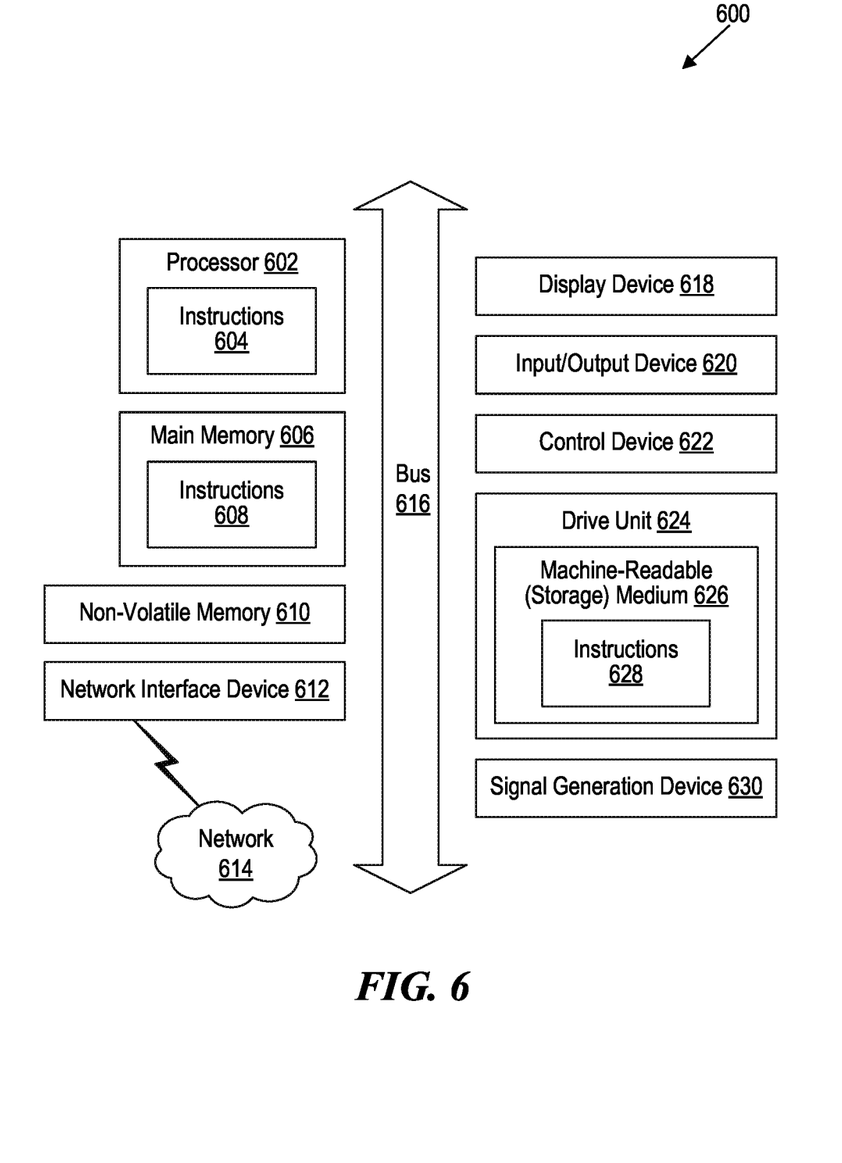
FIG. 6 illustrates an example of a computer system in which at least some operations described herein can be implemented.

FIG. 6 illustrates an example of a computer system 600 in which at least some operations described herein can be implemented. As shown, the computer system 600 can include: one or more processors 602, main memory 606, non-volatile memory 610, a network interface device 612, video display device 618, an input/output device 620, a control device 622 (e.g., keyboard and pointing device), a drive unit 624 that includes a storage medium 626, and a signal generation device 630, which are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementation, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real time, near real time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

Remarks

The terms "example," "embodiment," and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. A computer-implemented method comprising:
receiving, via a mobile device, a first request to access a first application of a first entity,
   wherein the first application includes first metadata indicative of a first set of business functions provided by the first application;
receiving, from an authentication service provider, user authentication information that attests to an identity of the user;
responsive to receiving the first request and the user authentication information,
   determining, using a user information database and based on the user authentication information, a second set of business functions accessible to the mobile device;
creating a token usable to determine a third set of business functions accessible to the mobile device through the first application,
   wherein the token is based on the second set of business functions and the first metadata,
   wherein the token can be decoded using a first secret of the first application to determine the third set of business functions;
providing, to the mobile device, access to the third set of business functions through the first application;
receiving, from the mobile device, a second request to access a second application of the first entity,
   wherein the second application includes second metadata indicative of a fourth set of business functions provided by the second application;
responsive to receiving the second request, decoding, using the first secret, the token to determine the second set of business functions;
responsive to decoding the token using the first secret, providing the second set of business functions to the second application to enable a fifth set of business functions accessible to the mobile device through the second application to be determined; and
providing, to the mobile device, access to the fifth set of business functions through the second application.

2. The method of claim 1, further comprising attempting to decode the token using a second secret of the second application, wherein the second secret is not usable to decode the token, wherein decoding the token using the first secret is responsive to attempting to decode the token using the second secret.

3. The method of claim 1, further comprising:
after creating the token, receiving, from the mobile device, a third request to access the first application; and
responsive to receiving the third request, providing, to the mobile device, access to the third set of business functions through the first application based on the token.

4. The method of claim 1, further comprising:
responsive to decoding the token using the first secret, creating an additional token usable to determine the fifth set of business functions,
wherein the additional token is based on the second set of business functions and the second metadata,
wherein the token can be decoded using the second secret to determine the fifth set of business functions.

5. The method of claim 1, further comprising storing the token in a header of an application programmable interface call associated with the mobile device.

6. The method of claim 1, wherein:
the token can be decoded using the first secret to determine the second set of business functions; and
the second set of business functions can be compared with the first metadata to determine the third set of business functions.

7. The method of claim 1, wherein the authentication service provider is different from the first entity.

8. The method of claim 1, wherein the first set of business functions includes one or more of: an operation to purchase an item from a website of the first entity, an operation to review a transaction history resulting from transactions on the website, and an operation to refund a transaction on the website.

9. The method of claim 1, wherein:
the authentication service provider includes a social networking platform; and
the user authentication information is received in response to the user being authenticated using an account of the user registered with the social networking platform.

10. At least one non-transitory, computer-readable storage medium storing instructions, which, when executed by at least one data processor, causes the at least one data processor to perform operations comprising:
receiving a request for a computing device of a user to access a first application provided by a first entity,
wherein the first application includes first metadata indicative of a first set of business functions provided by the first application;
receiving, from an authentication service provider, user authentication information that attests to an identity of the user;
responsive to receiving the request and the user authentication information,
determining, based on the user authentication information, a second set of business functions accessible to the computing device;
determining, based on the first metadata and the second set of business functions,
a third set of business functions accessible to the computing device through the first application;
in response to determining the third set of business functions, providing, to the computing device, access to the third set of business functions through the first application;
creating a token usable to determine the third set of business functions,
wherein the token can be decoded using a first secret of the first application to determine the third set of business functions;
receiving, from a second application provided by the first entity, the token,
wherein the second application includes second metadata indicative of a fourth set of business functions provided by the second application, and
wherein a second secret of the second application is not usable to decode the token to determine a fifth set of business functions accessible to the computing device through the second application; and
transmitting, to the second application, information usable to create an additional token usable to determine the fifth set of business functions based on the second metadata and the second set of business functions.

11. The at least one non-transitory, computer-readable storage medium of claim 10, wherein the operations further comprise:
responsive to receiving the token from the second application, decoding the token using the first metadata to determine the second set of business functions; and
responsive to decoding the token, providing the second set of business functions to the second application,
wherein the second set of business functions and the second metadata can be used to determine the fifth set of business functions.

12. The at least one non-transitory, computer-readable storage medium of claim 10, wherein the operations further comprise:
responsive to receiving the token from the second application, decoding, using the first secret, the token to determine the second set of business functions; and
receiving, from the second application, the second metadata to enable the fifth set of business functions accessible to the computing device through the second application to be determined using the second set of business functions and the second metadata.

13. The at least one non-transitory, computer-readable storage medium of claim 10, wherein:
the token can be decoded using the first secret to determine the second set of business functions; and
the second set of business functions and the first metadata can be used to determine the third set of business functions.

14. The at least one non-transitory, computer-readable storage medium of claim 10, wherein the operations further comprise:
after creating the token, receiving, from the computing device, a third request to access the first application; and
responsive to receiving the third request, providing, to the computing device, access to the third set of business functions through the first application based on the token.

15. The at least one non-transitory, computer-readable storage medium of claim 10, wherein the authentication service provider is different from the first entity.

16. A system comprising:
at least one hardware processor; and
at least one non-transitory memory storing instructions that, when executed by the at least one hardware processor, cause the system to:

receive a request for a computing device of a user to access a first application provided by a first entity,
  wherein the first application includes first metadata indicative of a first set of business functions provided by the first application;
authenticate the computing device based on user authentication information, from an authentication service provider, that attests to an identity of the user;
responsive to authenticating the user, receive a token,
  wherein the token cannot be decoded by a first secret of the first application to determine a second set of functions accessible to the computing device through the first application, and
  wherein the token can be decoded using a second secret of a second application to determine a third set of business functions accessible to the computing device on the second application;
responsive to receiving the token, provide the token to the second application;
responsive to providing the token to the second application, receive a fourth set of business functions accessible to the computing device;
determine the second set of business functions using the fourth set of business functions and the first metadata; and
provide, to the computing device, the second set of business functions through the first application.

17. The system of claim 16, wherein the system is further caused to:
  receive, from the second application, information usable to create an additional token based on the first metadata and the fourth set of business functions,
    wherein the additional token can be decoded using the first secret to determine the second set of business functions; and
  create the additional token using the information.

18. The system of claim 16, wherein the system is further caused to:
  receive, from the first application, information usable to create an additional token based on the first metadata and the fourth set of business functions,
    wherein the additional token can be decoded using the first secret to determine the second set of business functions;
  create the additional token using the information;
  after creating the additional token, receive another request for the computing device to access the second application; and
  provide, to the computing device, the second set of business functions through the first application based on the additional token.

19. The system of claim 16, wherein the system is further caused to, in response to receiving the token, attempt to decode the token using the first secret, wherein the token is provided to the second application in response to attempting to decode the token using the first secret.

* * * * *